United States Patent [19]

Breton et al.

[11] Patent Number: 5,679,741
[45] Date of Patent: Oct. 21, 1997

[54] USE OF A POLYMER BLEND BASED ON A POLYMERIZATE OF GROUPS OF TETRAFLUOROETHYLENE DERIVATIVES AS A PROCESSING AID FOR POLYVINYL CHLORIDE RESINS, CHLORINATED POLYVINYL CHLORIDE RESINS, POLYOLEFINS AND STYRENE-BASED RESINS

[75] Inventors: François Jean-Marie Breton, Ste Foy Les Lyons; Yves Lecomte, Breuill Le Vert, both of France

[73] Assignee: General Electric Company, Pittsfield, Mass.

[21] Appl. No.: 542,272

[22] Filed: Oct. 12, 1995

[30] Foreign Application Priority Data

Apr. 28, 1995 [FR] France ................... 95 05173

[51] Int. Cl.$^6$ ........................................ C08L 27/18
[52] U.S. Cl. ................. 525/71; 525/72; 525/199; 525/276
[58] Field of Search ................. 525/71, 72, 276, 525/199

[56] References Cited

U.S. PATENT DOCUMENTS

| | | | |
|---|---|---|---|
| 4,129,617 | 12/1978 | Machi | 260/879 |
| 4,506,035 | 3/1985 | Barnett | 521/53 |
| 4,879,362 | 11/1989 | Morgan | 526/247 |
| 4,904,726 | 2/1990 | Morgan et al. | 524/520 |
| 4,952,630 | 8/1990 | Morgan et al. | 525/72 |
| 4,952,636 | 8/1990 | Morgan et al. | 525/276 |
| 5,030,667 | 7/1991 | Shimizu et al. | 523/201 |
| 5,087,675 | 2/1992 | Takeo | 525/455 |
| 5,164,426 | 11/1992 | Shimizu et al. | 523/201 |
| 5,188,764 | 2/1993 | Shimizu et al. | 252/308 |
| 5,294,669 | 3/1994 | Kawashima | 525/129 |
| 5,296,165 | 3/1994 | Shimizu et al. | 252/311 |

FOREIGN PATENT DOCUMENTS

| | | |
|---|---|---|
| A-48 008 593 | 6/1973 | Japan . |
| A-48 052 830 | 7/1973 | Japan . |
| WO 91/05021 | 4/1991 | WIPO . |

*Primary Examiner*—Irina S. Zemel

[57] ABSTRACT

Use of a polymer blend based on a polymerizate of groups of tetrafluoroethylene derivatives as a processing aid for polyvinyl chloride resins, chlorinated polyvinyl chloride resins, polyolefins and styrene-based resins.

Use of a polymer blend as a processing aid for polyvinyl chloride resins, chlorinated polyvinyl chloride resins, polyolefins and styrene-based resins and their mixtures, the polymer blend comprising particles of tetrafluoroethylene polymerizate, these particles being totally or partially encapsulated by a styrene-acrylonitrile copolymer, the amount of the said blend used being such that the tetrafluoroethylane polymerizate represents between 0.05 parts by weight and 20 parts by weight per 100 parts by weight of resins and/or polymers processed.

7 Claims, No Drawings

USE OF A POLYMER BLEND BASED ON A POLYMERIZATE OF GROUPS OF TETRAFLUOROETHYLENE DERIVATIVES AS A PROCESSING AID FOR POLYVINYL CHLORIDE RESINS, CHLORINATED POLYVINYL CHLORIDE RESINS, POLYOLEFINS AND STYRENE-BASED RESINS

The subject of the present invention is the use of an blend based on a polymerizate of groups of tetrafluoroethylene derivatives (hereinafter designated by tetrafluoroethylene polymerizate) as a processing aid for polyvinyl chloride resins, chlorinated polyvinyl chloride resins, polyolefins and styrene-based resins and their mixtures, in particular rigid resins, and more particularly the use as a processing aid of an blend based on a tetrafluoroethylene polymerizate and a polymer or copolymer chosen from polyalkyl (meth) acrylates, poly(vinyl acetate), and styrene-acrylonitrile and styrene-acrylonitrile-alkyl (meth)acrylate copolymers.

Rigid polyvinyl chloride resins in particular are not processed in a liquid molten phase but in the form of a physical gel phase. This is due to the fact that, in order to melt polyvinyl chloride resins effectively, it is necessary to attain temperatures greater than 260° C., by which temperatures the resins are already degraded.

In order to treat a gel correctly, it is necessary to apply significant shear, generally obtained by extrusion by means of specially designed screws. Passage from the powdery state to the gel state (also called "melting") is accelerated by the use of a plasticizer (for soft formulations) or by incorporating processing aids (in the case of rigid formulations).

A convenient means of measuring "melting" acceleration is to measure the torque by means of an apparatus called a "Brabender Plasticorder". This melting is manifested by a peak during the torque measurement.

Many processing aids have already been used for polyvinyl chloride resins, chlorinated polyvinyl chloride resins, polyolefins and styrene-based resins and their mixtures, for example styrene-acrylonitrile copolymers, such as the processing aid sold under the commercial name of BLENDEX® 869 by GENERAL ELECTRIC SPECIALTY CHEMICALS, the methyl methacrylate-styrene-acrylonitrile copolymers sold under the commercial name of MixtureEX® 590 by GENERAL ELECTRIC SPECIALTY CHEMICALS, polymethyl methacrylates such as the products sold under the commercial names of PARALOID® K125 by RÖHM & HAAS and BÄRORAPID® 10F by the BÄRLOCHER Company. It has also been proposed, in Patent WO 9105021, to use fluoropolymers such as polytetrafluoroethylene as a processing aid for polyvinyl chloride resins.

However, it would be even more desirable to find processing aids which increase the rate of melting without impairing the mechanical properties of polyvinyl chloride resins, chlorinated polyvinyl chloride resins, polyolefins and styrene-based resins end their mixtures.

According to the present invention, it has been discovered that the use of a styrene-acrylonitrile/ tetrafluoroethylene polymerizate blend as a processing aid in polyvinyl chloride resins, chlorinated polyvinyl chloride resins, polyolefins and styrene-based resins and their mixtures proved to be particularly effective, and in particular appreciably reduced the melting time without impairing the other properties of the resins and polymers.

Polyvinyl chloride resins and chlorinated polyvinyl chloride resins are known materials and are described, inter alia, in the document "Vinyl and related polymers", Schildknecht, John Wiley & Sons, Inc., New York, 1952.

Polyolefins are well-known polymers and copolymers and comprise, inter alia, polyethylenes, such as, for example, low-density polyethylenes, high-density polyethylenes, linear low-density polyethylenes, polypropylenes, polybutylenes, polybutadienes and diene elastomers, such as EPDM rubbers.

Among the styrene-based resins used in the present invention, mention may be made of polystyrene, poly (α-alkylstyrenes) such as poly(α-methylstyrene), polyphenylane oxides, styrene-acrylonitrile and acrylonitrile-butadiene-styrene copolymers, high impact polystyrenes (HIPS) such as butadiene-styrene copolymers and their mixtures.

Styrene-based resins according to the invention also comprise mixtures of the above polymers and copolymers with other polymers such as, for example, polycarbonates.

The tetrafluoroethylene-polymerizate-based blends which can be used in the present invention comprise all the blends of this type, that is to say compositions including tetrafluoroethylene polymerizate particles totally or partially encapsulated in a copolymer chosen from polyalkyl(meth) acrylates, poly(vinyl acetate), and styrene-acrylonitrile and styrene-acrylonitrile-alkyl (meth)acrylate copolymers.

As tetrafluoroethylene polymerizates, it is possible to use, in the blends which can be used in the present invention, polytetrafluoroethylene, tetrafluoroethylene-hexafluoropropropylene copolymers, and tetrafluoroethylene copolymers with small amounts of copolymerizable ethylenically unsaturated monomers. The polymers are known and described, inter alia, in "Vinyl and related polymers", Schildknecht, John Wiley & Sons, Inc., New York, 1952, pages 484–494 and "Fluoropolymers", Woll, Wiley-Interscience, John Wiley & Sons, Inc. New York, 1972.

Among the polyalkyl (meth)acrylates used in the blends employed as processing aids according to the present invention, mention may be made of $C_1$ to $C_4$ polyalkyl acrylates and methacrylates. Preferably, polymethyl acrylate or methacrylate are used.

The styrene-acrylonitrile copolymers which can be used in the polymer blends used in the present invention are well-known copolymers available commercially.

The styrene-acrylonitrile-alkyl (meth)acrylate copolymers are also well-known and commercially available copolymers. Styrene-acrylonitrile-methyl methacrylate is particularly recommended.

The styrene-acrylonitrile/tetrafluoroethylene-polymerizate polymer blends may be obtained by various processes, such as latex coprecipitation (also called coagulation or coflocculation), vapour precipitation, or else by emulsion polymerization of styrene and acrylonitrile monomers in a tetrafluoroethylene polymerizate latex. Preferably, too, the emulsion polymerization takes place by radical route.

The proportion of tetrafluoroethylene polymerizate in the SAN/TFE-polymerizate polymer blend can vary widely and is generally between 0.01 and 80% by weight with respect to the total weight of the blend, and preferably between 0.05 and 70% by weight.

The TFE-polymerizate-based polymer blends particularly recommended are the blends prepared by emulsion polymerization, by radical route, that is to say by emulsion polymerization in a polytetrafluoroethylene latex. The emulsion polymerization can take place discontinuously, semi-continuously or continuously. Once the encapsulation polymer has been polymerized, it is then dried in order to obtain a powder of the polymer blend.

The term emulsion used in the present application denotes an emulsion alone or an emulsion-suspension.

The tetrafluoroethylene polymerizate latex can be introduced into the encapsulation-polymer or -copolymer polymerization reaction medium right from the start, that is to say before any polymerization has begun, or during polymerization, generally before 90% or more by weight of the monomers have been polymerized or copolymerized.

Generally, the tetrafluoroethylene polymerizate latex includes 20 to 80% by weight of solids and the size of the particles of this latex is between 0.05 and 20 µm (measured by laser diffraction), preferably 0.1 to 1 µm.

This recommended polymer blend forms a powder which flows freely, which does not tend to block and which is substantially free of tetrafluoroethylene polymerizate filaments forming a network connecting the particles of the blend together.

The polymer blends particularly recommended according to the invention are the SAN/tetrafluoroethylene-polymerizate blends, and even more preferably the SAN/polytetrafluoroethylene blends.

The proportions of tetrafluoroethylene-polymerizate-based polymer blend used as a processing aid in the resins processed according to the invention may vary widely end are such as to provide, in the mixture, generally between 0.05 parts by weight and 20 parts by weight of tetrafluoroethylene polymerizate per 100 parts by weight of resins and/or polymers processed, preferably 0.5 to 5 parts by weight.

EXAMPLES OF PREPARATION OF A SAN/PTFE BLEND BY EMULSION POLYMERIZATION

Novel polymer blends including tetrafluoroethylene polymerizate particles encapsulated by a styrene-acrylonitrile (SAN) copolymer were prepared using a semi-continuous emulsion process.

Polymerization:

The novel blends, comprising PTFE particles encapsulated by the styrene-acrylonitrile copolymers (PTFE/SAN) were prepared in the following manner:

a 15 liter reactor was used at a temperature of 60° C. and stirred at 120 revolutions per minute. The SAN copolymer was prepared by using a ferrous-ion/cumene hydroperoxide (CHP) redox system as a radical initiator in combination with an ethylenediaminetetraacetic acid (EDTA) chelating agent and sodium hydroxymethanesulphinate dihydrate (SFS) as reducing agent. t-Dodecyl mercaptan (TDM) was used as chain-transfer agent. The tetrafluoroethylene polymerizate latex was introduced in the form of a solution of the poymerizate in a soap. The soap system was tallow fatty acid (TFA). The reactor was initially charged with the entire soap/tetrafluoroethylene-polymerizate solution and with 15% by weight of all the other solutions (SFS/EDTA solution, FeSO$_4$ solution and monomer/TDM solution), before starting the feed with initiator. Next, only the CHP initiator was introduced for a certain time before starting the feed of all the other solutions. Once the feeds were completed, the reactor was kept stirred at a temperature of 60° C. during a maximum post-polymerization step of 180 minutes. A novel blend of tetrafluoroethylene-polymerizate/SAN was obtained.

The details of the manufacturing processes and of the blends obtained are indicated in Table 1 below.

TABLE 1

| EXAMPLE No. | 1 | 2 | 3 |
|---|---|---|---|
| SAN/PTFE ratio | 50/50 | 50/50 | 40/60 |
| Solids content (theoretical) | 24.3% | 34.6% | 34.6% |

| | Initial charge of the reactor: | | |
|---|---|---|---|
| Soap/PTFE solution: | parts by weight | parts by weight | parts by weight |
| Water | 106 | 114 | 114 |
| PTFE (dry) | 25 | 50 | 60 |
| Water of the PTFE | 15.676 | 28.964 | 34.757 |
| TFA (tallow fatty acid) | 0.285 | 0.570 | 0.456 |
| KOH | 0.0685 | 0.1507 | 0.1206 |

| | Reactor heated to 60° C. then addition of: | | |
|---|---|---|---|
| Solution of monomers: | | | |
| Styrene | 2.5926 | 5.2830 | 4.2264 |
| Acrylonitrile | 1.1111 | 2.2642 | 1.8113 |
| TDM | 0.0148 | 0.0302 | 0.0242 |
| SFS/EDTA solution: | | | |
| Water | 4.2963 | 5.2075 | 4.3774 |
| SFS | 0.0100 | 0.0204 | 0.0163 |
| EDTA | 0.000207 | 0.0004 | 0.0003 |
| FeSO$_4$ solution: | | | |
| Water | 0.7778 | 1.5094 | 1.5094 |
| FeSO$_4$, 7H$_2$O | 0.000081 | 0.0002 | 0.0001 |
| t = 0, start of feed: | | | |
| CHP | 0.4 | 0.2 | 0.16 |
| Feed time (min) | 27 | 53 | 53 |

| | | at | |
|---|---|---|---|
| t = (min) | 4 | 8 | 8 |
| Start of feed of: | | | |
| Solution of monomers: | | | |
| Styrene | 14.9074 | 29.7170 | 23.7736 |
| Acrylonitrile | 6.3889 | 12.7358 | 10.1887 |
| TDM | 0.0852 | 0.1698 | 0.1358 |
| SFS/EDTA solution: | | | |
| Water | 24.7037 | 29.2925 | 24.6226 |
| SFS | 0.0575 | 0.1146 | 0.0917 |
| EDTA | 0.0012 | 0.0024 | 0.0019 |
| FeSO$_4$ solution: | | | |
| Water | 4.4722 | 8.4906 | 8.4906 |
| FeSO$_4$, 7H$_2$O | 0.0005 | 0.0009 | 0.0007 |
| Feed time (min) | 23 | 45 | 45 |
| Reactor kept at 60° C. after completing the feeds: | | | |
| Time (min) | 120 | 180 | 180 |

The conversion (based on the solids content) and the pH were monitored as function of time for each example.

The results are indicated in Table 2.

TABLE 2

| | Example 1 | | Example 2 | | Example 3 | |
|---|---|---|---|---|---|---|
| Time (min) | Conversion (%) | pH | Conversion (%) | pH | Conversion (%) | pH |
| 0 | 1.11 | 9.56 | 1.04 | 10.01 | 4.8 | 9.83 |
| 15 | | | 1.57 | 10.08 | 4.21 | 9.94 |
| 19 | 7.22 | 9.62 | | | | |
| 30 | 21.55 | 9.61 | 8.92 | 10.06 | 9.49 | 9.84 |

TABLE 2-continued

| | Example 1 | | Example 2 | | Example 3 | |
|---|---|---|---|---|---|---|
| Time (min) | Conversion (%) | pH | Conversion (%) | pH | Conversion (%) | pH |
| 45 | 44.68 | 9.5 | 29.24 | 9.89 | 28.58 | 9.62 |
| 60 | 62.8 | 9.43 | 51.37 | 9.75 | 51.57 | 9.56 |
| 75 | 69.22 | 9.38 | | | | |
| 90 | 73.42 | 9.35 | 85.79 | 9.5 | 85.71 | 9.41 |
| 105 | 77.46 | 9.23 | | | | |
| 120 | 80.67 | 9.28 | 91.62 | 9.56 | 93.22 | 9.35 |
| 135 | 83.8 | 9.15 | | | | |
| 150 | 87.25 | 9.15 | 93.06 | 9.56 | 95.02 | 9.31 |
| 180 | | | 93.7 | 9.55 | 95.82 | 9.32 |
| 210 | | | 93.87 | 9.59 | 96.18 | 9.28 |
| 233 | | | 93.7 | 9.5 | 96.32 | 9.28 |

Coagulation and drying:

The polymer blends obtained were introduced in an acid solution (two parts of sulphuric acid in water) and heated to 95° C. with vigorous stirring. The solids content was 15% by weight. Introduction of the blend latexes was completed in approximately 10 minutes. The slurry obtained was kept stirred at this temperature for 20 minutes before centrifuging. The powder obtained was then re-impasted for 30 minutes at 55°. The solids content of the paste was 18%. After centrifugation, the powder obtained was dried in a fluidized-bed dryer at a temperature of 60° C. for approximately 2 hours. A free-flowing powder having a final moisture content of between 0.3 and 0.4% was obtained.

The particle sizes of the blends obtained are indicated in Table 3 below.

TABLE 3

| Particle size (mm) | PTFE/SAN 50/50 | PTFE/SAN 50/50 | PTFE/SAN 60/40 |
|---|---|---|---|
| >1,000 | 23.5% | 33.6% | 9.9% |
| >800 | 36.9% | 43.7% | 14.9% |
| <160 | 3.8% | 3.3% | 20.4% |
| <63 | 0.9% | 1.0% | 4.8% |
| <50 | 0.7% | 0.9% | — |
| average | 650 | 720 | 360 |

COMPARATIVE EXAMPLES A TO N AND EXAMPLES 1 TO 9

In the following examples, unless indicated otherwise, the quantities are expressed in parts by weight.

Various known processing aids, as well as SAN/tetrafluoroethylene-poymerizate polymer blends, were mixed, in the proportions indicated in Table 4 below, with a polyvinyl chloride resin containing lubricants and stabilizers. The SAN/PTFE blends used were all prepared as above by emulsion polymerization in a PTFE latex and in the proportions indicated, namely 50/50, 60/40 end 70/30.

The melting time, the melting-peak Brabender torque, the plateau Brabender torque, the melt elongation, the melt tensile strength, the die swell end the Metrastat yellowing time were measured for all the compositions. The results re given in Table 5 below.

TABLE 4

| | EXAMPLES (parts by weight) | | | | | | | | | | | | | |
|---|---|---|---|---|---|---|---|---|---|---|---|---|---|---|
| Components | A | B | C | D | E | F | G | H | I | J | K | L | M | N |
| PVC resin | 100 | 100 | 100 | 100 | 100 | 100 | 100 | 100 | 100 | 100 | 100 | 100 | 100 | 100 |
| Lubricants | | | | | | | | | | | | | | |
| Epoxidized soya oil | 2 | 2 | 2 | 2 | 2 | 2 | 2 | 2 | 2 | 2 | 2 | 2 | 2 | 2 |
| La stearate | 0.3 | 0.3 | 0.3 | 0.3 | 0.3 | 0.3 | 0.3 | 0.3 | 0.3 | 0.3 | 0.3 | 0.3 | 0.3 | 0.3 |
| Loxiol G15[1] | 1.5 | 1.5 | 1.5 | 1.5 | 1.5 | 1.5 | 1.5 | 1.5 | 1.5 | 1.5 | 1.5 | 1.5 | 1.5 | 1.5 |
| AC316 A wax[2] | 0.5 | 0.5 | 0.5 | 0.5 | 0.5 | 0.5 | 0.5 | 0.5 | 0.5 | 0.5 | 0.5 | 0.5 | 0.5 | 0.5 |
| Loxiol G30[3] | 0.2 | 0.2 | 0.2 | 0.2 | 0.2 | 0.2 | 0.2 | 0.2 | 0.2 | 0.2 | 0.2 | 0.2 | 0.2 | 0.2 |
| Stabilizers | | | | | | | | | | | | | | |
| Octyl tin thioglycolate T17 M | 1.5 | 1.5 | 1.5 | 1.5 | 1.5 | 1.5 | 1.5 | 1.5 | 1.5 | 1.5 | 1.5 | 1.5 | 1.5 | 1.5 |
| Trinonylphenyl phosphite | 0.5 | 0.5 | 0.5 | 0.5 | 0.5 | 0.5 | 0.5 | 0.5 | 0.5 | 0.5 | 0.5 | 0.5 | 0.5 | 0.5 |
| Processing aid | | | | | | | | | | | | | | |
| Mixtureex 869[4] | — | 0.5 | 1.0 | 2.0 | | | | | | | | | | |
| Mixtureex 590[5] | — | | | | 0.5 | 1.0 | 2.0 | | | | | | | |
| PTFE | — | | | | | | | 0.5 | 1.0 | 2.0 | | | | |
| SAN K 1158[6] | — | | | | | | | | | | 0.5 | 1.0 | 2.0 | |
| Encapsulated 50/50 SAN/PTFE | — | | | | | | | | | | | | | |
| Encapsulated 60/40 SAN/PTFE | — | | | | | | | | | | | | | |
| Encapsulated 70/30 SAN/PTFE | — | | | | | | | | | | | | | |

| Components | 1 | 2 | 3 | 4 | 5 | 6 | 7 | 8 | 9 |
|---|---|---|---|---|---|---|---|---|---|
| PVC resin | 100 | 100 | 100 | 100 | 100 | 100 | 100 | 100 | 100 |
| Lubricants | | | | | | | | | |
| Epoxidized soya oil | 2 | 2 | 2 | 2 | 2 | 2 | 2 | 2 | 2 |
| La stearate | 0.3 | 0.3 | 0.3 | 0.3 | 0.3 | 0.3 | 0.3 | 0.3 | 0.3 |
| Loxiol G15[1] | 1.5 | 1.5 | 1.5 | 1.5 | 1.5 | 1.5 | 1.5 | 1.5 | 1.5 |
| AC316 A2 wax[2] | 0.5 | 0.5 | 0.5 | 0.5 | 0.5 | 0.5 | 0.5 | 0.5 | 0.5 |
| Loxiol G30[3] | 0.2 | 0.2 | 0.2 | 0.2 | 0.2 | 0.2 | 0.2 | 0.2 | 0.2 |
| Stabilizers | | | | | | | | | |

TABLE 4-continued

| | EXAMPLES (parts by weight) | | | | | | | | | |
|---|---|---|---|---|---|---|---|---|---|---|
| Octyl tin thioglycolate T17 M | 1.5 | 1.5 | 1.5 | 1.5 | 1.5 | 1.5 | 1.5 | 1.5 | 1.5 |
| Trinonylphenyl phosphite | 0.5 | 0.5 | 0.5 | 0.5 | 0.5 | 0.5 | 0.5 | 0.5 | 0.5 |
| Processing aid | | | | | | | | | |
| Mixtureex 869[4] | | | | | | | | | |
| Mixtureex 590[5] | | | | | | | | | |
| PTFE | | | | | | | | | |
| SAN K 1158[6] | | | | | | | | | |
| Encapsulated 50/50 SAN/PTFE | 0.5 | 1.0 | 2.0 | | | | | | |
| Encapsulated 60/40 SAN/PTFE | | | | 0.5 | 1.0 | 2.0 | | | |
| Encapsulated 70/30 SAN/PTFE | | | | | | | 0.5 | 1.0 | 2.0 |

[1] Loxiol G15 is a mixture of fatty-acid esters, commercialized by the HENKEL Company
[2] AC316 A wax is an oxidized polyethylene wax commercialized by the ALLIED CHEMICALS Company
[3] Loxiol G30 is a mixture of fatty esters, commercialized by the HENKEL Company
[4] Mixtureex 869 is a SAN copolymer, of $6 \times 10^6$ weight-average molecular weight, commercialized by GENERAL ELECTRIC SPECIALTY CHEMICALS
[5] Mixtureex 590 is a MMA/SAN copolymer, commercialized by GENERAL ELECTRIC SPECIALTY CHEMICALS
[6] SAN obtained by emulsion polymerization.

TABLE 5

| Example | Melting time (minutes) | Melting-peak Brabender torque (N · m) | Plateau Brabender torque (N · m) | Melt elongation (%) | Melt tensile strength (cN) | Die swell (%) | Metrastat yellowing time (min) |
|---|---|---|---|---|---|---|---|
| A | 4.30 | 3800 | 2500 | 404 | 293 | 14 | 17 |
| B | 2.45 | 4000 | 2450 | 425 | 267 | 18 | 17 |
| C | 1.45 | 4050 | 2500 | 594 | 492 | 33 | 17 |
| D | 2.30 | 4200 | 2650 | 742 | 612 | 41 | 16 |
| E | 2.00 | 3900 | 2500 | 534 | 372 | 25 | 15 |
| F | 1.45 | 4300 | 2450 | 550 | 426 | 27 | 13 |
| G | 1.30 | 4100 | 2500 | 621 | 466 | 35 | 17 |
| H | 2.00 | 3800 | 2650 | 215 | 320 | 55 | 16 |
| I | 1.30 | 4100 | 2750 | 239 | 613 | 74 | 14 |
| J | 1.40 | 5500 | 3100 | 152 | 960 | 84 | 14 |
| K | 1.45 | 3650 | 2000 | 458 | 332 | 21 | 16 |
| L | 1.45 | 3700 | 2500 | 469 | 226 | 18 | 14 |
| M | 2.00 | 3800 | 2450 | 361 | 240 | 19 | 14 |
| N | 4.30 | 3800 | 2500 | 404 | 293 | 14 | 17 |
| 1 | 1.30 | 4000 | 2500 | 169 | 346 | 45 | 19 |
| 2 | 1.00 | 3800 | 2500 | 255 | 452 | 65 | 17 |
| 3 | 1.00 | 4700 | 2600 | 260 | 1024 | 78 | 14 |
| 4 | 2.15 | 3850 | 2500 | 398 | 320 | 33 | 13 |
| 5 | 2.00 | 4000 | 2550 | 360 | 373 | 51 | 12 |
| 6 | 1.20 | 4400 | 2700 | 239 | 427 | 78 | 15 |
| 7 | 2.15 | 3700 | 2450 | 452 | 320 | 25 | 14 |
| 8 | 1.45 | 3900 | 2500 | 265 | 413 | 37 | 15 |
| 9 | 1.40 | 4400 | 2400 | 239 | 493 | 55 | 15 |

It is apparent from Table 5 that the use of SAN/tetrafluoroethylene polymerizate polymer blend as a processing aid appreciably increases the rate of melting.

The use of such a blend increases the rate of melting compared to the use of polytetrafluoroethylene or of styrene-acrylonitrile alone, which clearly shows that there is a synergy in the use of these two polymers in the form of a blend.

In addition, the use of the SAN/tetrafluoroethylene-polymerizate polymer blends as a processing aid in polyvinyl chloride resins appreciably increases the melt strength compared to the known processing aids.

As a result, the use of the SAN/tetrafluoroethylene-polymerizate polymer blends as a processing aid in for polyvinyl chloride resins makes it possible to obtain a unique combination of properties, that is to say an extremely rapid rate of melting with a very high melt strength, without significantly affecting the thermal stability of the polyvinyl chloride resin.

The use of the polymer blend according to the invention, as a processing aid, proves to be particularly advantageous for obtaining rigid polyvinyl chloride foam.

We claim:

1. A method of using a polymer blend as a processing aid for polyvinyl chloride resins, chlorinated polyvinyl chloride resins, polyolefins and styrene-based resins and their mixtures, the polymer bend comprising particles of a tetrafluoroethylene polymerizate, these particles being totally or partially encapsulated by a polymer or copolymer selected from the group consisting of polyalkyl (meth) acrylates, polyvinyl acetate, styrene-acrylonitrile copolymers and styrene-acrylonitrile-alkyl (meth)acrylate copolymers, the amount of said blend used being such that the tetrafluoroethylene polymerizate content is between 0.05 parts by weight and 20 parts by weight per 100 parts by weight of resin, polyolefin or mixture processed.

2. The method according to claim 1, characterized in that the proportion of the polymer blend is such that the tetrafluoroethylene polymerizate represents 0.5 to 5 parts by weight per 100 parts by weight of resins and/or polymers processed.

3. The method according to claim 1 or 2, characterized in that, in the polymer blend, the tetrafluoroethylene polymerizate represents 0.01 to 80% by weight with respect to the total weight of the blend.

4. The method according to claim 1, characterized in that, in the polymer blend, the tetrafluoroethylene polymerizate represents 0.05 to 70% by weight with respect to the total weight of the blend.

5. A method according to claim 1, characterized in that the polymer blend is obtained by emulsion polymerization of the styrene and the acrylonitrile in the presence of the tetrafluoroethylene.

6. The method according to claim 1, characterized in that the polymerization of the styrene-acrylonitrile monomers taken placed by radical route.

7. A method according to claim 1, wherein the polymer blend is used as a processing aid for a polyvinyl chloride resin.

* * * * *